(12) United States Patent
Emery et al.

(10) Patent No.: US 6,402,917 B1
(45) Date of Patent: Jun. 11, 2002

(54) ELECTRODIALYSIS APPARATUS

(75) Inventors: Nigel Emery; Roger Woodward, both of High Wycombe; Paul Whitehead, Thames Oxon, all of (GB)

(73) Assignee: OTV Societe Anonyme, Saint Maurice (FR)

( * ) Notice: Subject to any disclaimer, the term of this patent is extended or adjusted under 35 U.S.C. 154(b) by 0 days.

(21) Appl. No.: 09/601,406

(22) PCT Filed: Feb. 5, 1999

(86) PCT No.: PCT/US99/02552

§ 371 (c)(1),
(2), (4) Date: Sep. 19, 2000

(87) PCT Pub. No.: WO99/39810

PCT Pub. Date: Aug. 12, 1999

(30) Foreign Application Priority Data

Feb. 9, 1998 (GB) .............................................. 9802732

(51) Int. Cl.[7] .......................... C02F 1/469; B01D 61/48

(52) U.S. Cl. ........................................ 204/524; 204/633
(58) Field of Search ................................ 204/524, 533, 204/536, 632, 633

(56) References Cited

U.S. PATENT DOCUMENTS 3,149,061 A * 9/1964 Parsi ........................... 204/180
3,654,884 A * 7/1969 Gilliland ...................... 204/301

* cited by examiner

*Primary Examiner*—Arun S. Phasge
*Assistant Examiner*—Thomas H. Parsons
(74) *Attorney, Agent, or Firm*—Wolf, Greenfield & Sacks, P.C.

(57) ABSTRACT

An electrodialysis apparatus and method for purifying water. An electrodialysis apparatus including an anode and anode chamber, a cathode and cathode chamber, and a desalting stream flow path comprising a first portion juxtaposed to the anode and a second portion juxtaposed to the cathode is described. By passing water through the apparatus, purified water is produced.

71 Claims, 5 Drawing Sheets

ELECTRODIALYSIS APPARATUS

BACKGROUND OF THE INVENTION

1. Field of the Invention

The present invention relates to an electrodialysis apparatus for purifying water and also embraces a method of electrodialysis.

2. Description of the Related Art

As will be well known to those skilled in the art, electrodialysis comprises passing a desalting stream of water to be purified between an anode and a cathode. Perm-selective membranes are positioned between the desalting stream and the electrodes, such that cations migrating towards the cathode pass through a cation selective membrane, whilst anions migrating towards the anode pass through an anion perm-selective membrane. As electrodialysis proceeds, the water to be purified is progressively depleted of ions. In some instances, an ion exchange resin bed is placed in the desalting stream, and this has the advantage of maintaining the electrical conductivity of the water to be purified as deionisation proceeds. Electrodialysis in which an ion exchange resin bed is used in the water to be purified is known as electrodeionisation.

U.S. Pat. No. 3,645,884 (Gilliland) discloses a five compartment electrodeionisation cell comprising outer anode and cathode compartments and a central concentrating compartment. A desalting compartment is positioned between each electrode compartment and the central concentrating compartment. The desalting compartment nearest the anode is separated from the anode chamber and from the central concentrating compartment by two, respective cation selective membranes. Similarly, the desalting compartment nearest the cathode is separated from the cathode chamber and from the concentrating compartment by two, respective anion selective membranes.

In operation, water to be purified is passed through the two desalting compartments in succession, and a voltage is applied across the anode and cathode, such that cations are caused to migrate from the water to be purified in the desalting compartment nearest the anode into the central concentrating compartment, and anions are caused to migrate from the water to be purified in the desalting compartment nearest the cathode into the concentrating compartment. Each of the desalting compartments comprises a porous bed of ion exchange material.

According to U.S. Pat. No. 3,645,884, the anode compartment is filled with a weakly acidic solution, whilst the cathode department is filled with a weakly alkaline solution. Thus, in operation, hydronium ions from the anode compartment are caused or allowed to pass into the adjacent desalting compartment to assist in driving out the cation impurities in the water to be purified. Analogously, hydroxide ions in the cathode compartment are caused or allowed in use to pass into the juxtaposed desalting compartment to assist in driving out the anion impurities from the desalting stream into the central concentrating chamber.

U.S. Pat. No. 3,645,884 discloses that when a 0.085N sodium chloride solution is deionised for a period of two hours by impressing a current of 12 amperes at 10 to 20 volts across the ion exchange beds, a final product having a sodium chloride concentration of 0.0085N is achieved, indicating a 90% removal of ions from the water to be purified. The final product water has a conductivity of 1025 $\mu$S/cm at 25° C.

SUMMARY OF THE INVENTION

It is an object of the present invention to provide an improved electrodialysis apparatus.

In particular, it is an object of the present invention to provide an electrodialysis apparatus which is capable of producing highly-purified water, that is water having a conductivity of less than 0.20 $\mu$S/cm, i.e. a resistivity of at least 5 M$\Omega$-cm and, under suitable operating and feed conditions, of at least 15 M$\Omega$-cm i.e. a conductivity of less than 0.067 $\mu$S/cm at 25° C.

According to one aspect of the present invention therefore, there is provided an electrodialysis apparatus for purifying water, which apparatus comprises means defining an anode chamber, means defining a cathode chamber, an anode means disposed within the anode chamber, a cathode means disposed within said cathode chamber, means defining a desalting stream flow path between said anode and said cathode means, means defining a concentrating stream flow path adjacent said desalting stream flow path, means for causing or allowing water to be purified to flow within the desalting stream flow path and means for causing or allowing a fluid adapted to receive ionic impurities from the water to be purified to flow within the concentrating stream flow path; wherein said desalting stream flow path comprises a first portion juxtaposed the anode means and a second portion juxtaposed said cathode means, and said means defining the desalting stream flow path comprises two first partition means that separate the first portion of the desalting stream flow path from the anode chamber and the concentrating stream flow path respectively, which first partition means are selectively permeable to cations and are spaced apart on an axis between said anode means and cathode means, and two second partition means that separate the second portion of the desalting stream flow path from the cathode chamber and the concentrating stream flow path respectively, which second partition means are selectively permeable to anions and are spaced apart on said axis; characterised in that each of said anode and cathode chambers contains a porous bed of ion exchange material.

In some embodiments, the cathode chamber may contain anion exchange resin. Said anode chamber may contain cation exchange resin.

BRIEF DESCRIPTION OF THE DRAWINGS

Following is a description by way of example only with reference to the accompanying drawings of embodiments of the present invention.

In the drawings.

DETAILED DESCRIPTION OF THE INVENTION

In another aspect of the present invention there is provided a method of electrodialysis comprising causing or allowing water to be purified to flow in the desalting stream flow path of an electrodialysis apparatus in accordance with the present invention, causing or allowing a fluid adapted to receive ionic impurities from said water to be purified to flow within the concentrating stream path and applying a voltage across the anode means and cathode means.

In some embodiments, substantially pure water may be caused or allowed to flow in the anode and/or cathode chamber, and preferably substantially pure water is used in both the anode chamber and the cathode chamber. By "substantially pure water" is meant water having a resistivity of at least 1 MΩ-cm, preferably at least 15 MΩ-cm.

It has been found that the electrodialysis apparatus of the present invention can be used to produce high purity water, that is water having a resistivity of at least 15 MΩ-cm.

Conveniently, the substantially pure water used within the anode and/or cathode chamber may be water that has been purified using the apparatus of the invention. Typically, means may be provided for supplying water that has been purified in the desalting stream flow path to the anode and/or cathode chamber. It is also envisaged that in some cases, the water used in one or both of the electrode chamber may be recycled through a secondary purifier, e.g. a second electrodialysis or electrodeionisation device.

Preferably the fluid supplied to the concentrating stream flow path is also substantially pure water, and in some embodiments means may be provided for supplying substantially pure water that has been purified within the desalting stream flow path to the concentrating stream flow path. However, the invention also embraces the use of water of lower quality in the concentrating stream flow path.

The electrodialysis apparatus of the present invention does not require the addition of acid or alkali to the electrode chambers and relies on water splitting at the electrodes for the generation of hydronium and hydroxide ions for replenishing the ion change resins within the electrode compartments and for assisting in driving out the ionic impurities from the desalting stream flow paths into the concentrating stream.

In some embodiments, water that has been purified within the desalting stream may be caused or allowed to flow in parallel through the concentrating stream and at least one of the anode and cathode chambers. Alternatively, the substantially pure water may be caused or allowed to flow successively through at least one of the anode and cathode chambers and then through the concentrating stream flow path. Preferably, the fluid within the concentrating stream is caused or allowed to flow counter-current to the flow of water to be purified in at least one of the first and second portions of the desalting streams flow paths. Preferably the water within at least one of the anode and cathode chambers is caused or allowed to flow counter-current to the flow of water to be purified in at least one of said first and second portions.

Said concentrating stream flow path may contain a porous bed of ion exchange material.

Usually the desalting stream flow path will contain a porous bed of ion exchange material. Said first portion may contain cation exchange resin, and said second portion may contain anion exchange resin.

The water to be purified may be passed through the first and second portions of the desalting stream flow path in any order, although preferably the water to be purified is passed through the first portion first, followed by the second portion. In this way, the water to be purified is acidified in the first portion by the presence of hydronium ions generated by water splitting at the anode. The water to be purified is thus slightly acidic when it enters the second portion which contains hydroxide ions produced at the cathode. This arrangement, as will be appreciated by those skilled in the art, will assist in reducing the build-up of scale in the apparatus.

It is envisaged that in some embodiments the water to be purified may be passed in succession through two or more electrodeionisation apparatus according to the present invention.

In another aspect of the present invention therefore there is provided polyelectrodialysis apparatus comprising two electrodialysis apparatus in accordance with the present invention. In some embodiments, one of the electrodes of the polyelectrodialysis apparatus in accordance with the invention may be shared by both electrodialysis apparatus. The polyelectrodialysis apparatus may comprise a single anode or cathode that is common to both electrodialysis apparatus.

Where the water to be purified passes through two electrodialysis apparatus in accordance with the present invention, it is preferred that the water to be purified passes successively through the first and second portions of the first electrodialysis apparatus, and then through the second and first portions in succession of the second electrodialysis apparatus, so that the water to be purified is given a final polish by passage through a cation exchange resin bed.

Figure 1:
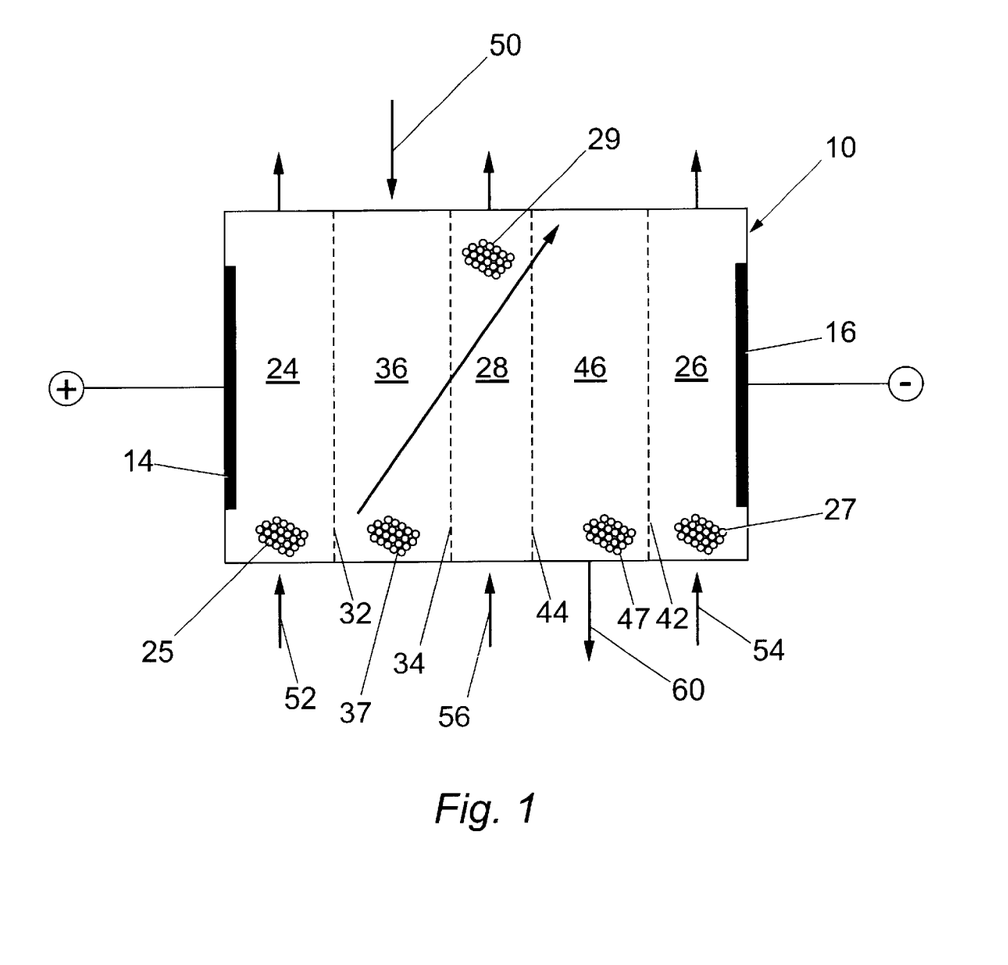
FIG. 1 is a flow diagram of a first electrodialysis apparatus in accordance with the present invention.

With reference to FIG. 1, a first electrodialysis apparatus 10 in accordance with the present invention comprises an anode 14 and a cathode 16 that is spaced from the anode. The anode, which may be a platinum coated anode, is accommodated within an anode compartment 24 and the cathode 16 is accommodated within a cathode compartment 26. Intermediate the anode and cathode compartments 24, 26 the apparatus 10 comprises three further compartments, namely a first desalting compartment 36 adjacent the anode compartment 24, a second desalting compartment 46 adjacent the cathode compartment 26 and a concentrating compartment 28 interposed between said first and second desalting compartments 36, 46.

The anode compartment 24 is partitioned from the first desalting compartment 36 by a first cation perm-selective membrane 32 and said first desalting compartment 36 is partitioned from the concentrating compartment 28 by a second cation perm-selective membrane 34. Similarly, the cathode compartment 26 is partitioned from the second desalting compartment 46 by a first anion perm-selective membrane 42, and the second desalting compartment 46 is partitioned from the concentrating compartment 28 by a second anion perm-selective membrane 44.

The construction of an electrodialysis apparatus of this kind will be generally well known to those skilled in the art and has been described inter alia in numerous prior patent specifications (see, e.g. GB-A-769307, EP-A-0078842, EP-A-0710895).

It is envisaged that the apparatus will conveniently comprise a stack of juxtaposed compartment-forming elements of predetermined thickness with the ion selective membranes 32, 34, 42, 44 interposing between neighbouring elements. The electrodes 14, 16 will be formed as thin plates or screens and each will be interposed between an electrode compartment-forming element and an adjacent end plate.

Each compartment-forming element may be manufactured from a thermoplastic material and will be formed with a large, central opening that extends through the element and forms a compartment, with the body of the element defining the outer perimeter of the compartment. The elements may further be drilled or moulded with one or more through-bores around the central opening. In the assembled stack, these bores will align with corresponding bores in the juxtaposed elements to form ports for conveying fluids between compartments interiorly of the stack. The ends of each compartment will be closed in the assembled stack by the neighbouring membranes. An end plate will be provided at each end of the stack, and the assembly will be held together by such means as a plurality of bolts that extend between the end plates, through aligning apertures formed in all of the elements. Compressible, fluid-tight seals will typically be interposed between each element/plate and the neighbouring membranes, which seals will be compressed by drawing the end plates together tightly by means of the bolts. As this kind of construction will be generally familiar to those skilled in the art, no further description of it is given herein.

In the electrodialysis apparatus of the present invention, the thickness of each of the desalting compartments 36, 46 in the electrode-electrode direction may be in the range 5 to 40 mm, and the thickness of the electrode and concentrating compartments 24, 26, 28 may be in the region of 2 to 30 mm.

The anode compartment 24 of the apparatus of FIG. 1 contains a porous bed of cation exchange resin 25, and the cathode compartment 26 contains a porous bed of anion exchange resin 27. As cation exchange resin may be used, any suitable resin known to those skilled in the art such as, for example, that which is commercially available from Dow Liquid Separations under the trade mark DOWEX MARATHON C. Said anion exchange resin may similarly be any suitable resin known to those skilled in the art such, for example, a DOWEX MARATHON A.

The first desalting compartment 36 also contains a porous bed of cation exchange resin 37 and the second desalting compartment 46 contains a porous bed of anion exchange resin 47. The concentrating compartment 28 also contains a porous bed of ion exchange resin 29 which may be cation exchange resin, anion exchange resin or a mixture of both of these.

Each of the compartments 24, 26, 28, 36, 46 is provided with an inlet and an outlet. In use, the inlet to the first desalting compartment 36 is connected to a supply 50 of water to be purified.

Internal porting (not shown) may be included to connect the outlet of the first desalting chamber 36 to the inlet of the second desalting chamber 46, and the inlets/outlets of the desalting chambers 36, 46 may be arranged such that the water to be purified flows in the same direction through both desalting chambers as shown in FIG. 1.

Substantially pure water, that is water having a purity of at least 1 MΩ-cm is supplied to each of the electrode chambers 24, 26 and may also be supplied to the concentrating chamber 28 to provide respectively electrode chamber streams 52, 54 and a concentrating, flushing stream 56.

In use, an operating voltage of 2 to 100V is applied across the anode 14 and cathode 16 sufficient to obtain water splitting at the electrodes. Cations in the water to be purified are taken up on the cation exchange resin 37 in the first desalting chamber 36, being replaced in solution by hydronium ions. Hydronium ions generated at the anode 14 pass via the first cation exchange membrane 32 into the cation resin bed under the influence of the applied electrical potential. As they pass through the cation resin bed, the hydronium ions regenerate the cation exchange resin by being exchanged for cations from the water to be purified 50. The hydronium ions and the impurity cations pass via the second cation exchange membrane 34 into the concentrating chamber 28 from which they cannot proceed further towards the cathode 16 owing to the presence of the second anion selective membrane 44. The cations are thus eluted from the concentrating chamber 28 by the action of the high purity "flushing" stream 56 flowing through the concentrating chamber 28.

In a similar manner, anions in the water to be purified are carried to the concentrating chamber 28 under the influence of the cathode-generated hydroxide ions and the electrical potential, via the anion exchange resin 47 in the second desalting chamber 46 and the second anion selective membrane 44. The impurity anions are also eluted by the flushing stream 56 within the concentrating chamber 28. The product water 60 is delivered from the outlet of the second desalting chamber 46.

Figure 2:
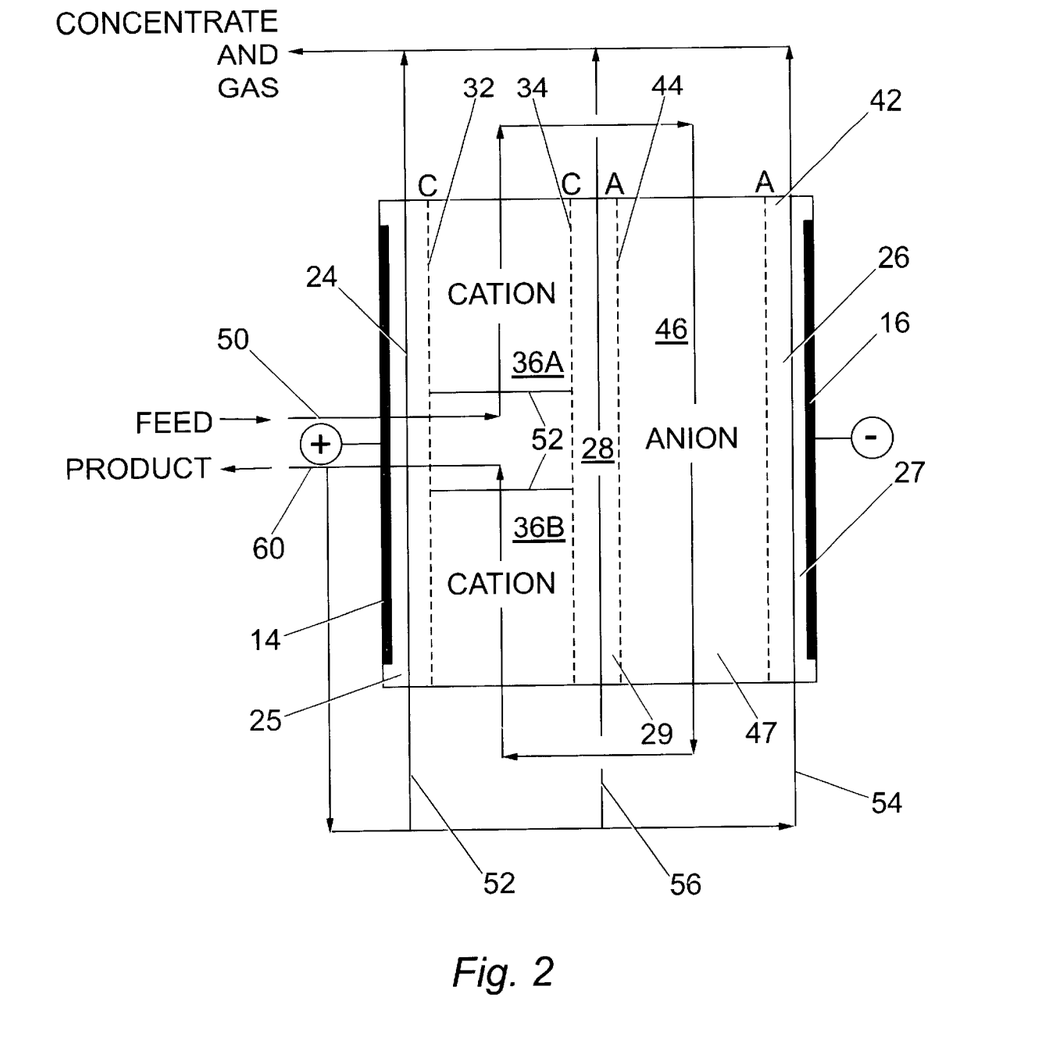
FIG. 2 is a flow diagram of a second electrodialysis apparatus in accordance with the present invention.

FIG. 2 shows a second electrodialysis apparatus in accordance with the invention which is suitable for use on a small scale. Many of the components of the apparatus of FIG. 2 are common to the apparatus of FIG. 1 and, for these, the identical reference numerals as used in FIG. 1 are used. It will be seen that the electrodialysis apparatus of FIG. 2 differs from that shown in FIG. 1 in that the first desalting chamber 36 is divided by means of internal partitions 52 into two sub-chambers 36a, 36b.

The water to be purified 50 is supplied in succession to one of the sub-chambers 36a of the first desalting compartment 36, then to the second desalting compartment 46 and finally to the second sub-chamber 36b of the first desalting compartment 36. The water to be purified 50 is thus passed in succession through a cation exchange resin bed, an anion exchange resin bed and finally a cation exchange resin bed which gives the water to be purified a final, polishing treatment. As is also apparent from FIG. 2, a portion of the product water 60 is supplied in parallel to the electrode chambers 24, 26 and to the concentrating chamber 28. Although not shown in FIG. 2, internal porting is conveniently provided in the stack to make the necessary connections between the various chambers. Each of the desalting compartments 36a, 36b, 46 of the electrodialysis apparatus of FIG. 2 has a thickness of 8 mm in the electrode-electrode direction. The widths of the electrode compartments 24, 26 and the concentrating compartment 28 are each about 5 mm.

Those skilled in the art will appreciate that the highest purity water of the flushing stream is thus allowed to flow through the anode chamber 24 and concentrating chamber 28 juxtaposed the flow through the second sub-chamber 36b of the first desalting compartment 36, so that the highest purity water is flowing juxtaposed the water to be purified 50 just before it exits the apparatus as product 60.

It has been found that when the electrodialysis apparatus of FIG. 2 is used to treat recirculating water from a tank having an initial conductivity of 15 to 20 µS-cm, a final purity of 17 MΩ-cm can be achieved.

Figure 3:
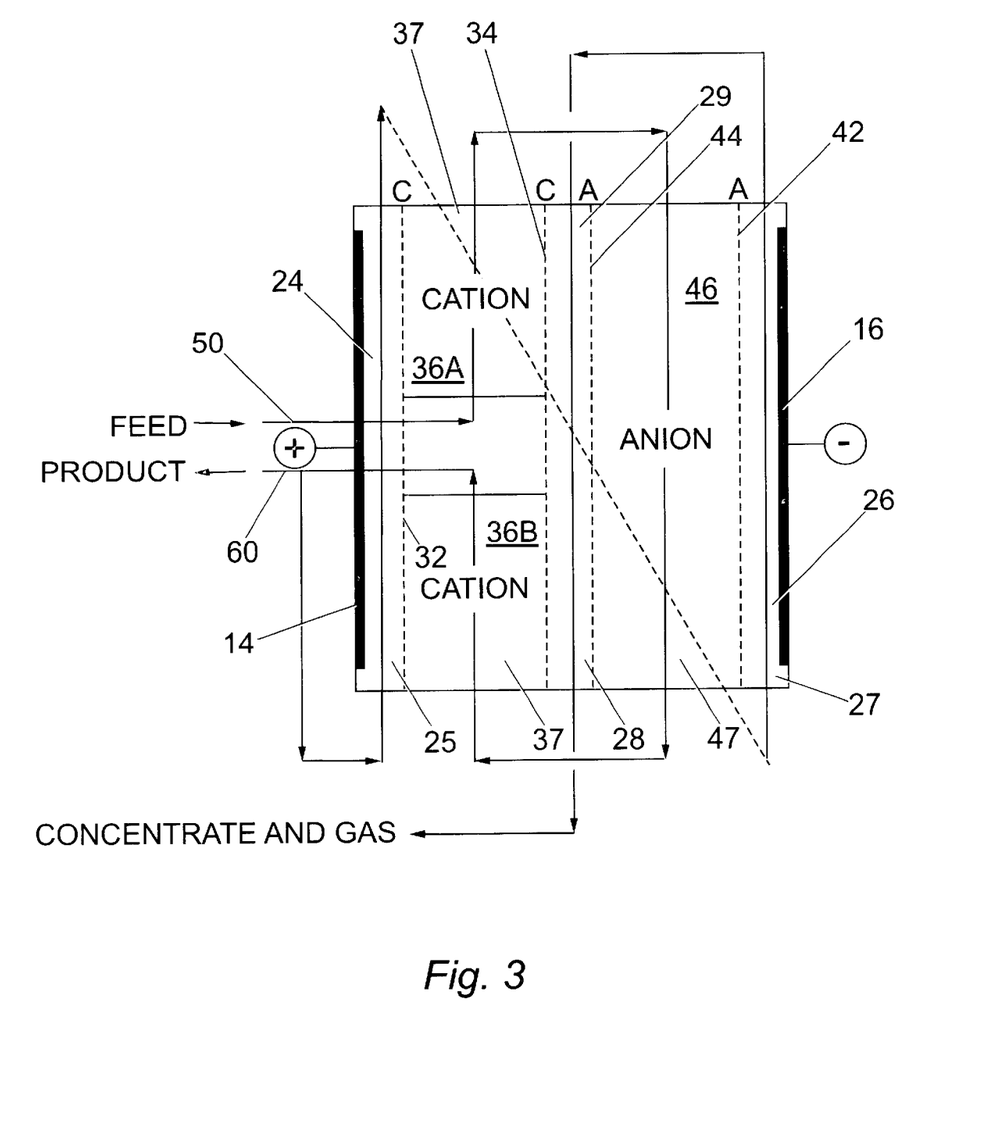
FIG. 3 is another flow diagram of a third electrodialysis apparatus in accordance with the present invention.

A third electrodialysis apparatus in accordance with the present invention is illustrated in FIG. 3. The construction of the third electrodialysis apparatus is similar to that of the second electrodialysis apparatus illustrated in FIG. 2, and accordingly the same reference numerals will be used for like parts as before. The difference between the second and third electrodialysis apparatus resides in the flow path of the electrode and concentration streams through the apparatus.

In the third electrodialysis apparatus illustrated in FIG. 3, a portion of the product stream 60 is returned through the apparatus and is directed to flow through the anode chamber 24, the cathode chamber 26 and the concentrating chamber 28 in succession. It will be seen from FIG. 3 that the streams through the electrode chambers 24, 26 are directed to flow in the same direction as one another, with the stream through the concentrating chamber 28 flowing in the opposite direction.

Figure 4:
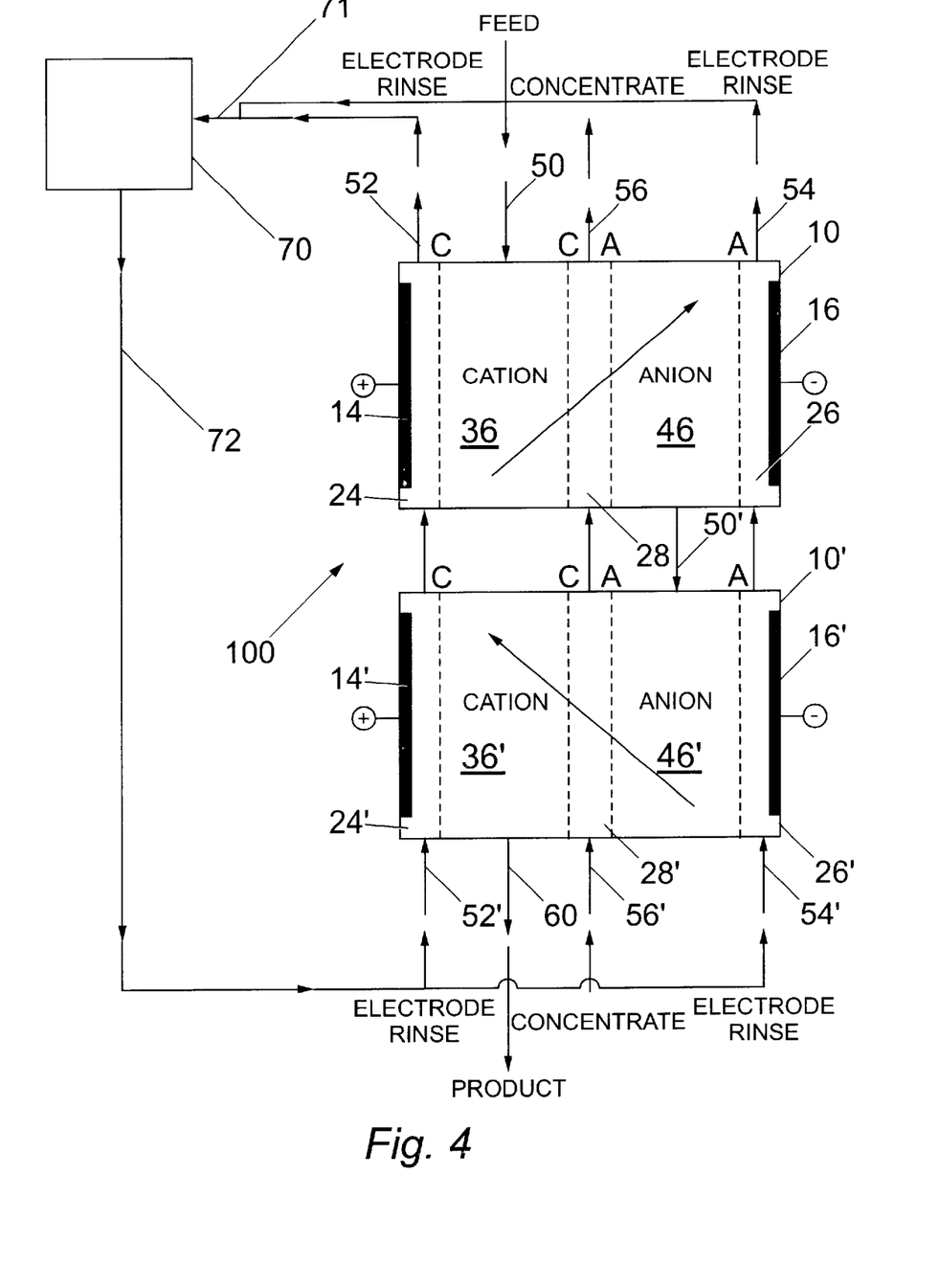
FIG. 4 is a flow diagram of a first polyelectrodialysis apparatus in accordance with the present invention.

FIG. 4 shows a first polyelectrodialysis apparatus 100 in accordance with the present invention. This apparatus comprises two electrodialysis apparatus 10, 10' of the kind described above with reference to FIG. 1. The components of each electrodialysis apparatus 10, 10' of the polyelectrodialysis apparatus of FIG. 4 that are the same as or similar to the components of the electrodialysis apparatus of FIG. 1 are indicated by the same reference numerals as used in FIG. 1, with the prime being used to indicate components of the second electrodialysis apparatus 10'.

As can be seen from FIG. 4, the water to be purified 50 is supplied firstly to the first desalting chamber 36 of the first electrodialysis apparatus 10 and then, through internal porting (not shown), to the second desalting chamber 46 of the first electrodialysis apparatus 10. The outlet 50' of the second desalting chamber 46 of the first electrodialysis apparatus 10 is connected to the second desalting chamber 46' of the second electrodialysis apparatus 10', and internal porting (not shown) within the second electrodialysis apparatus 10' is provided to supply the feed from the second desalting chamber 46' to the first desalting chamber 36'. The water to be purified 50 is thus passed successively through a cation exchange resin bed 36, a first anion exchange resin bed 46, a second anion exchange resin bed 46' and finally a second cation exchange resin bed 36' for polishing. The product water 60 is delivered from the outlet of the first desalting chamber 36' of the second electrodialysis apparatus 10'.

Conversely, the electrode streams 52, 54, 52', 54' and the concentrating streams 56, 56' are supplied firstly to the second electrodialysis apparatus 10' and subsequently to the first apparatus 10. This assists in reducing the back diffusion of impurity ions from the electrode/concentrating streams into the desalting stream.

As can be seen from FIG. 4, the electrode streams 52, 54 exiting the first electrodialysis apparatus 10 are combined to provide an input stream 71 to a secondary purifier 70. Said secondary purifier 70 may be any suitable water purifier known to those skilled in the art, although a further electrodialysis apparatus or polyelectrodialysis apparatus in accordance with the present invention is preferred. Secondary purifier 70 has an output stream 72 which is used to feed the electrode streams 52', 54' of the second electrodialysis apparatus 10'.

In the apparatus shown in FIG. 4, each of the desalting chambers 36, 46, 36', 46' has a thickness in the electrode-electrode direction of about 15 mm, and each of the electrode and concentrating chambers 24, 26, 28, 24', 26', 28' has a thickness of about 15 mm.

It has been found that when operating the polyelectrodialysis apparatus as illustrated in FIG. 4 for over 2000 hours at a flow rate of 1.0 l/min of water of 12 to 15 $\mu$S/cm, water having a resistivity of 16.9 to 17.2 M$\Omega$-cm at 25° C. is produced.

Figure 5:
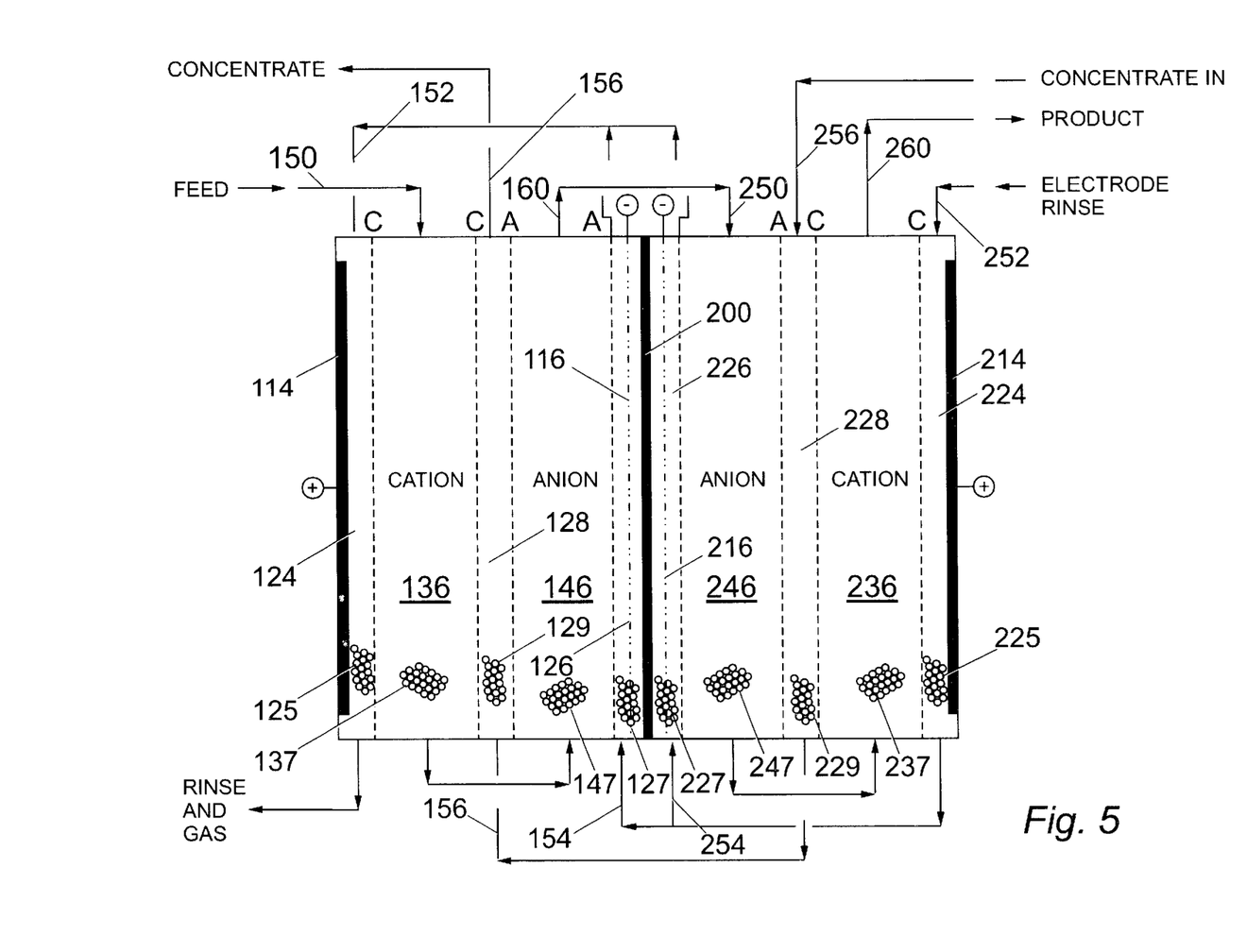
FIG. 5 is a flow diagram of a second polyelectrodialysis apparatus in accordance with the present invention.

A second polyelectrodialysis apparatus is illustrated in FIG. 5. This second apparatus comprises two juxtaposed electrodialysis apparatus of the kind hereinbefore described with reference to FIG. 1. The second polyelectrodialysis apparatus differs from that illustrated in FIG. 4 in that the two electrodialysis apparatus constituting the polyelectrodialysis apparatus are formed as a single stack of compartment-forming elements of the kind described above. The electrodialysis apparatus are arranged in the stack back-to-back, so that the cathode chamber 126 of one of the electrodialysis apparatus is disposed juxtaposed the cathode chamber 226 of the other electrodialysis apparatus. A central, water-impervious partition 200 partitions the two electrodialysis apparatus one from the other. Water to be purified 150 is supplied to the first desalting compartment 136 of one of the electrodialysis apparatus, then to the second desalting compartment 146 of the one apparatus. A feed 160 from the second desalting compartment 146 of the one apparatus is supplied to the second desalting compartment 246 of the other electrodialysis apparatus, and subsequently to the first desalting compartment 236 of the other electrodialysis apparatus. The water to be purified 150 thus passes successively through a first cation exchange resin bed 137, a first anion exchange resin bed 147, a second anion exchange resin bed 247 and a second cation exchange resin bed 237.

Substantially pure or pretreated water is supplied as a concentrating, flushing stream 256 to the concentrating compartment 228 of the other electrodialysis apparatus and then to the concentrating compartment 128 of the one electrodialysis apparatus, so that the concentrating stream flows through the polyelectrodialysis apparatus in the opposite direction from the water to be purified 150. A separate electrode rinsing stream 252 of high purity water is supplied to the anode compartment 224 of the other electrodialysis apparatus, and then in parallel to the cathode compartments 126, 226 of the one and other electrodialysis apparatus. The cathode rinsing streams are then recombined and passed through the anode compartment 124 of the one electrodialysis apparatus. Thus, as with the concentrating, flushing stream 256, the electrode rinsing stream is passed through the polyelectrodialysis apparatus in the opposite direction to the water to be purified 150 (the desalting stream). In this way, the back diffusion of impurity ions into the desalting stream is reduced.

Each of the electrode, concentrating and desalting compartments of the polyelectrodialysis apparatus illustrated in FIG. 5 has a thickness in the anode to cathode direction of about 15 mm. When the second polyelectrodialysis apparatus is operated for over 3500 hours with feed water of 10 to 20 $\mu$S/cm, having 25 to 35 ppm dissolved carbon dioxide, at a rate of 1.0 to 1.5 litres per minute, the resistivity of the product water 260 on exiting the stack is found to be in the range 15 to 17.5 M$\Omega$-cm.

As with the electrodialysis apparatus illustrated in FIGS. 2 and 3, the polyelectrodialysis apparatus shown in FIG. 4 or 5 may be modified so that the concentrating flushing stream and/or the electrode rinsing streams are fed by a part of the product water which is returned through the apparatus.

In another variation, the central partition 200 of the second polyelectrodialysis apparatus may be omitted, such that the apparatus includes a single, central cathode chamber. Single cathode chamber may include a single cathode or anode which is shared by the said one and other electrodialysis apparatus.

The present invention thus provides an improved electrodialysis apparatus in which water to be purified is passed successively through a cation exchange resin bed and an anion exchange resin bed between an anode and a cathode. The anode and cathode are separated from the desalting stream by cation and anion perm-selective membranes respectively, and the cathode and anode compartments are filled with ion exchange resin material. Each of the electrode compartments is supplied with a feed of substantially pure water, and in use the electrodialysis apparatus of the invention is found to give product water of surprisingly high purity.

What is claimed is:
1. An electrodialysis apparatus for purifying water, which apparatus comprises means defining an anode chamber, means defining a cathode chamber, an anode means disposed within the anode chamber, a cathode means disposed within said cathode chamber, means defining a desalting stream flow path between said anode and said cathode means, means defining a concentrating stream flow path adjacent said desalting stream flow path, means for causing or allowing water to be purified to flow within the desalting stream flow path and means for causing or allowing a fluid adapted to receive ionic impurities from the water to be purified to flow within the concentrating stream flow path; wherein said desalting stream flow path comprises a first portion juxtaposed the anode means and a second portion juxtaposed said cathode means, and said means defining the desalting stream flow path comprises two first partition means that separate the first portion of the desalting stream flow path from the anode chamber and the concentrating stream flow path respectively, which first partition means are selectively permeable to cations and are spaced apart on an axis between said anode means and cathode means, and two second partition means that separate the second portion of the desalting stream flow path from the cathode chamber and the concentrating stream flow path respectively, which second partition means are selectively permeable to anions and are spaced apart on said axis; characterised in that each of said anode and cathode chambers contains a porous bed of ion exchange material.

2. An apparatus as claimed in claim 1 wherein the ion exchange material in the cathode chamber is an anion exchange resin.

3. An apparatus as claimed in claim 1 or claim 2 wherein the ion exchange material in the anode chamber is a cation exchange resin.

4. An apparatus as in claim 1 wherein the concentrating stream flow path contains a porous bed of ion exchange material.

5. An apparatus as in claim 1 wherein the first portion contains cation exchange resin, and the second portion contains anion exchange resin.

6. An apparatus as in claim 1 wherein water is caused or allowed to flow through at least one of the anode chamber and cathode chamber.

7. An apparatus as in claim 6 wherein the water to flow through at least one of the anode chamber and cathode chamber is water purified by the apparatus.

8. An apparatus as in claim 7 wherein the water to flow through at least one of the anode chamber and cathode chamber is taken directly from the outlet water of the desalting stream.

9. An apparatus as in claim 6 wherein water is caused or allowed to flow successively through the anode chamber and the cathode chamber.

10. An apparatus as in claim 9 wherein water is caused or allowed to flow successively through the anode chamber and then the cathode chamber.

11. An apparatus as in claim 6, wherein the water flow through at least one of the anode chamber and cathode chamber is caused or allowed to subsequently flow flow through the concentrating stream flow path.

12. An apparatus as in claim 11 wherein a portion of purified water prepared by the apparatus is caused or allowed to flow sequentially through the anode chamber, the cathode chamber and the concentrating stream flow path.

13. An apparatus as in claim 6 wherein water is caused or allowed to flow in parallel to the concentrating stream in at least one of the anode and cathode chambers.

14. An apparatus as in claim 6 wherein the water within at least one of the anode and cathode chambers is caused or allowed to flow countercurrent to the flow of water to be purified in at least one of said first and second portions.

15. An apparatus as in claim 1 wherein the fluid within the concentrating stream is caused or allowed to flow countercurrent to the flow of water to be purified in at least one of the first and second portions of the desalting stream flow paths.

16. An apparatus as in claim 1 wherein the water to be purified is is caused or allowed to pass, through the first portion first, followed by the second portion.

17. An apparatus as in claim 16 wherein the water to be purified is caused or allowed to flow in the same direction through both portions.

18. An apparatus as in claim 1 wherein the first desalting stream is divided to form two or more subchambers, and wherein the desalting stream is caused or allowed to flow in succession to one of the subchambers in the first desalting compartment, then through the second desalting compartment, and subsequently through a second subchamber of the first desalting compartment.

19. An apparatus as in claim 2 wherein the concentrating stream flow path contains a porous bed of ion exchange material.

20. An apparatus as in claim 2 wherein the first portion contains cation exchange resin, and the second portion contains anion exchange resin.

21. An apparatus as in claim 2 wherein water is caused or allowed to flow through at least one of the anode chamber and cathode chamber.

22. An apparatus as in claim 21 wherein the water to flow through at least one of the anode chamber and cathode chamber is water purified by the apparatus.

23. An apparatus as in claim 22 wherein the water to flow through at least one of the anode chamber and cathode chamber is taken directly from the outlet water of the desalting stream.

24. An apparatus as in claim 21 wherein water is caused or allowed to flow successively through the anode chamber and the cathode chamber.

25. An apparatus as in claim 24 wherein water is caused or allowed to flow successively through the anode chamber and then the cathode chamber.

26. An apparatus as in claim 21, wherein the water flow through at least one of the anode chamber and cathode chamber is caused or allowed to subsequently flow through the concentrating stream flow path.

27. An apparatus as in claim 26 wherein a portion of purified water prepared by the apparatus is caused or allowed to flow sequentially through the anode chamber, the cathode chamber and the concentrating stream flow path.

28. An apparatus as in claim 21 wherein water is caused or allowed to flow in parallel to the concentrating stream in at least one of the anode and cathode chambers.

29. An apparatus as in claim 2 wherein the fluid within the concentrating stream is caused or allowed to flow countercurrent to the flow of water to be purified in at least one of the first and second portions of the desalting stream flow paths.

30. An apparatus as in claim 21 wherein the water within at least one of the anode and cathode chambers is caused or allowed to flow countercurrent to the flow of water to be purified in at least one of said first and second portions.

31. An apparatus as in claim 2 wherein the water to be purified is caused or allowed to pass through the first portion first, followed by the second portion.

32. An apparatus as in claim 31 wherein the water to be purified is caused or allowed flow in the same direction through both portions.

33. An apparatus as in claim 2 wherein the first desalting stream is divided to form two or more subchambers, and wherein the desalting stream is caused or allowed to flow in succession to one of the subchambers in the first desalting compartment, then through the second desalting compartment, and subsequently through a second subchamber of the first desalting compartment.

34. An apparatus as in claim 3 wherein the concentrating stream flow path contains a porous bed of ion exchange material.

35. An apparatus as claimed in claim 3 wherein the first portion contains cation exchange resin, and the second portion contains anion exchange resin.

36. An apparatus as in claim 3 wherein water is caused or allowed to flow through at least one of the anode chamber and cathode chamber.

37. An apparatus as in claim 36 wherein the water to flow through at least one of the anode chamber and cathode chamber is water purified by the apparatus.

38. An apparatus as in claim 37 wherein the water to flow through at least one of the anode chamber and cathode chamber is taken directly from the outlet water of the desalting stream.

39. An apparatus as in claim 36 wherein water is caused or allowed to flow successively through the anode chamber and the cathode chamber.

40. An apparatus as in claim 37 wherein water is caused or allowed to flow successively through the anode chamber and then the cathode chamber.

41. An apparatus as in claim 37, the water flow through at least one of the anode chamber and cathode chamber subsequently is caused or allowed to flow through the concentrating stream flow path.

42. An apparatus as in claim 41 wherein a portion of purified water prepared by the apparatus is caused or allowed to flow sequentially through the anode chamber, the cathode chamber and the concentrating stream flow path.

43. An apparatus as in claim 36 wherein water is caused or allowed to flow in parallel to the concentrating stream in at least one of the anode and cathode chambers.

44. An apparatus as in claim 36 wherein the water within at least one of the anode and cathode chambers is caused or allowed to flow countercurrent to the flow of water to be purified in at least one of said first and second portions.

45. An apparatus as in claim 3 wherein the fluid within the concentrating stream is caused or allowed to flow countercurrent to the flow of water to be purified in at least one of the first and second portions of the desalting stream flow paths.

46. An apparatus as in claim 3 wherein the water to be purified is caused or allowed to pass through the first portion first, followed by the second portion.

47. An apparatus as in claim 46 wherein the water to be purified is caused or allowed to flow in the same direction through both portions.

48. An apparatus as in claim 3 wherein the first desalting stream is divided to form two or more subchambers, and wherein the desalting stream caused or allowed to flow in succession to one of the subchambers in the first desalting compartment, then through the second desalting compartment, and subsequently through a second subchamber of the first desalting compartment.

49. A method of electrodialysis comprising causing or allowing water to be purified to flow in the desalting stream flow path of an apparatus as in claim 1, and causing or allowing a fluid adapted to receive ionic impurities from said water to be purified to flow within the concentrating stream path and applying a voltage across the anode means and cathode means.

50. The method of claim 49 further comprising a step of producing water having a resistivity of at least 1 MΩ-cm.

51. The method of claim 50 wherein the water has a resistivity of at least 15 MΩ-cm.

52. A method of electrodialysis comprising causing or allowing water to be purified to flow in the desalting stream flow path of an apparatus as in claim 2, and causing or allowing a fluid adapted to receive ionic impurities from said water to be purified to flow within the concentrating stream path and applying a voltage across the anode means and cathode means.

53. The method of claim 52 further comprising a step of producing water having a resistivity of at least 1 MΩ-cm.

54. The method of claim 53 wherein the water has a resistivity of at least 15 MΩ-cm.

55. A method of electrodialysis comprising causing or allowing water to be purified to flow in the desalting stream flow path of an apparatus as in claim 3, and causing or allowing a fluid adapted to receive ionic impurities from said water to be purified to flow within the concentrating stream path and applying a voltage across the anode means and cathode means.

56. The method of claim 55 further comprising a step of producing water having a resistivity of at least 1 MΩ-cm.

57. The method of claim 56 wherein the water has a resistivity of at least 15 MΩ-cm.

58. A polyelectrodialysis apparatus comprising two or more electrodialysis apparatus' as defined in claim 1.

59. A polyelectrodialysis apparatus as in claim 58 wherein water to be purified through two electrodialysis apparatus' is caused or allowed to pass successively through the first and second portions of the first electrodialysis apparatus and then successively through the second and first portions of the second electrodialysis apparatus.

60. A polyelectrodialysis apparatus as in claim 58 or 59 wherein at least one of the concentrating streams, anode chambers and cathode chambers are is caused or allowed to be fed by a water purified be the apparatus.

61. A polyelectrodialysis apparatus as in claim 60 including a flow through the anode chambers and cathode chambers, wherein at least on of the anode chamber flows, cathode chamber flows and the concentrating stream flows is caused or allowed to flow firstly through the second electrodialysis apparatus and subsequently through the first electrodialysis apparatus.

62. A polyelectrodialysis apparatus as in claim 58 or 59 wherein the outflow from at least one of the anode chambers, cathode chambers and concentrating streams is caused or allowed to pass through a purifier for reuse in the apparatus.

63. A polyelectrodialysis apparatus as in claim 58 or 59 wherein two or more of the electrodialysis apparatus' are juxtaposed to form a single stack.

64. A polyelectrodialysis apparatus as in claim 58 or 59 wherein two or more of the electrode chambers are shared by two adjacent electrodialysis apparatus'.

65. A polyelectrodialysis apparatus comprising two or more electrodialysis apparatus' as defined in claim 6.

66. A polyelectrodialysis apparatus as in claim 65 wherein water to be purified through two electrodialysis apparatus' is caused or allowed to pass successively through the first and second portions of the first electrodialysis apparatus and then successively through the second and first portions of the second electrodialysis apparatus.

67. A polyelectrodialysis apparatus as in claim 65 or 66 wherein at least one of the concentrating streams, anode chambers and cathode chambers is caused or allowed to be fed by a water purified by the apparatus.

68. A polyelectrodialysis apparatus as in claim 67 including a flow through the anode chambers and cathode chambers, wherein at least one of the anode chamber flows, cathode chamber flows and the concentrating stream flows is caused or allowed to flow firstly through the second electrodialysis apparatus and subsequently through the first electrodialysis apparatus.

69. A polyelectrodialysis apparatus as in claim 65 or 66 wherein the outflow from at least one of the anode chambers, cathode chambers and concentrating streams is caused or allowed to pass through a purifier for reuse in the apparatus.

70. A polyelectrodialysis apparatus as in claim 65 or 66 wherein two or more of the electrodialysis apparatus' are juxtaposed to form a single stack.

71. A polyelectrodialysis apparatus as in claim 65 or 66 wherein two or more of the electrode chambers are shared by two adjacent electrodialysis apparatus'.

* * * * *